United States Patent
Nam et al.

(10) Patent No.: US 10,432,975 B2
(45) Date of Patent: Oct. 1, 2019

(54) METHOD FOR ENCODING/DECODING IMAGE AND DEVICE FOR SAME

(71) Applicant: LG Electronics Inc., Seoul (KR)

(72) Inventors: Junghak Nam, Seoul (KR); Chulkeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/737,157

(22) PCT Filed: Jun. 13, 2016

(86) PCT No.: PCT/KR2016/006241
§ 371 (c)(1),
(2) Date: Dec. 15, 2017

(87) PCT Pub. No.: WO2016/204462
PCT Pub. Date: Dec. 22, 2016

(65) Prior Publication Data
US 2018/0176602 A1  Jun. 21, 2018

Related U.S. Application Data

(60) Provisional application No. 62/180,071, filed on Jun. 16, 2015.

(51) Int. Cl.
*H04N 7/12* (2006.01)
*H04N 19/82* (2014.01)
(Continued)

(52) U.S. Cl.
CPC .......... *H04N 19/82* (2014.11); *H04N 19/107* (2014.11); *H04N 19/117* (2014.11);
(Continued)

(58) Field of Classification Search
CPC .. H04N 19/107; H04N 19/117; H04N 19/124; H04N 19/176; H04N 19/70; H04N 19/82; H04N 19/91; H04N 19/96
See application file for complete search history.

(56) References Cited

U.S. PATENT DOCUMENTS

2013/0336393 A1    12/2013  Matsumura et al.
2014/0105308 A1*    4/2014  Matsuo ............... H04N 19/593
                                                            375/240.16
(Continued)

FOREIGN PATENT DOCUMENTS

KR   10-2009-0098214    9/2009
KR   10-2012-0118782   10/2012
(Continued)

*Primary Examiner* — Jessica M Prince
(74) *Attorney, Agent, or Firm* — Fish & Richardson P.C.

(57) ABSTRACT

Disclosed in the present invention are a method for encoding/decoding an image and a device for same. Particularly, a method for decoding an image may comprise the steps of: parsing the weight value (w) of a loop filter from a bitstream outputted from an encoder; applying the loop filter to an image obtained by using a prediction signal and a differential signal; and generating a recovered image and a reference image by performing the weighted sum of the recovered image before the loop filter is applied and the recovered image after the loop filter is applied, based on the w.

8 Claims, 8 Drawing Sheets

(51) Int. Cl.
*H04N 19/107* (2014.01)
*H04N 19/117* (2014.01)
*H04N 19/124* (2014.01)
*H04N 19/91* (2014.01)
*H04N 19/176* (2014.01)
*H04N 19/70* (2014.01)
*H04N 19/96* (2014.01)

(52) U.S. Cl.
CPC ......... *H04N 19/124* (2014.11); *H04N 19/176* (2014.11); *H04N 19/70* (2014.11); *H04N 19/91* (2014.11); *H04N 19/96* (2014.11)

(56) References Cited

U.S. PATENT DOCUMENTS

2014/0198844 A1* 7/2014 Hsu .................. H04N 19/70
375/240.07
2014/0286392 A1* 9/2014 Lim .................. H04N 19/619
375/240.02

FOREIGN PATENT DOCUMENTS

| | | |
|---|---|---|
| KR | 10-2014-0065024 | 5/2014 |
| WO | 2014094829 | 6/2014 |

* cited by examiner (A)          (B)

Intra:

2Nx2N

NxN

Inter:

2Nx2N

NxN

2NxN

Nx2N nLx2N nRx2N

2NxnU

2NxnD

METHOD FOR ENCODING/DECODING IMAGE AND DEVICE FOR SAME

CROSS-REFERENCE TO RELATED APPLICATIONS

This application is a National Stage application under 35 U.S.C. § 371 of International Application No. PCT/KR2016/006241, filed Jun. 13, 2016, which claims the benefit of U.S. Provisional Application No. 62/180,071, filed on Jun. 16, 2015. The disclosures of the prior applications are incorporated by reference in their entirety.

TECHNICAL FIELD

The present invention relates to a method for processing video and, more particularly, to an encoding/decoding method using a method for applying a weighting parameter-based loop filtering to a image decoding-completed image, and a device supporting the same.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

An aspect of the present invention provides an encoding/decoding method using a method for applying a weighting parameter-based loop filtering to a image decoding-completed image.

Another aspect of the present invention provides a method for deriving a weighting parameter.

An aspect of the present invention provides a method for generating a reconstructed image and/or a reference image on the basis of a weighting parameter.

Technical subjects obtainable from the present invention are non-limited by the above-mentioned technical task. And, other unmentioned technical tasks can be clearly understood from the following description by those having ordinary skill in the technical field to which the present invention pertains.

Technical Solution

According to an aspect of the present invention, there is provided a method for decoding an image, including: parsing a weight value (w) of a loop filter from a bit stream output from an encoder; applying the loop filter to an image obtained using a predicted signal and a residual signal; and generating a reconstructed image and a reference image by performing (or finding) the weighted sum of the reconstructed image before the loop filter is applied and the reconstructed image after the loop filter is applied, on the basis of the w.

In an aspect of the present invention, there is provided a device for decoding an image, including: an entropy-decoding unit parsing a weight value (w) of a loop filter from a bit stream output from an encoder; a filtering applying unit applying the loop filter to an image obtained using a predicted signal and a residual signal; and a reconstructed image and reference image generating unit generating a reconstructed image and a reference image by performing (or finding) the weighted sum of the reconstructed image before the loop filter is applied and the reconstructed image after the loop filter is applied, on the basis of the w.

Preferably, 1-w may be applied to the reconstructed image before the loop filter is applied and w is applied to the reconstructed image after the loop filter is applied and added to generate the reconstructed image.

Preferably, w may be applied to the reconstructed image before the loop filter is applied and 1-w is applied to the reconstructed image after the loop filter is applied and added to generate the reconstructed image.

Preferably, the method may further include: parsing a flag indicating whether the w is used from the bit stream, wherein when it is indicated by the flag that w is used, the reconstructed image and the reference image may be generated on the basis of the w.

Preferably, when it is indicated by the flag that the w is not used, loop filtering may be performed respectively to generate the reconstructed image and the reference image.

Preferably, when a predetermined image is referred to by M number of images, only M−1 number of weight values regarding M−1 number of images among the M number of images may be transmitted through the bit stream, and a weight value regarding an image for which a weight value was not transmitted, among the M number of images, may be determined on the basis of the M−1 number of weight values.

Preferably, the loop filter may be applied after one or more of a deblocking filter and a sample adaptive offset (SAO) are applied to an image obtained using the predicted signal and the residual signal.

Preferably, a value for minimizing an error between an image generated by performing (or finding) the weighted sum of an original image as a current encoding target and an original image as a next encoding target on the basis of the w and a reconstructed image regarding the original image as the current encoding target may be determined.

Advantageous Effects

According to an embodiment of the present invention, image quality of a currently decoded image may be enhanced by applying a weighting parameter-based loop filtering to an image decoding-completed image.

According to an embodiment of the present invention, since weighting parameter-based loop filtering is applied to an image decoding-completed image, image quality of a reference image referred to by images decoded thereafter may be enhanced to enhance accuracy of reference.

According to an embodiment of the present invention, since accuracy of reference is enhanced, accuracy of prediction may be increased to resultantly increase compression efficiency.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

BEST MODES

Figure 1:
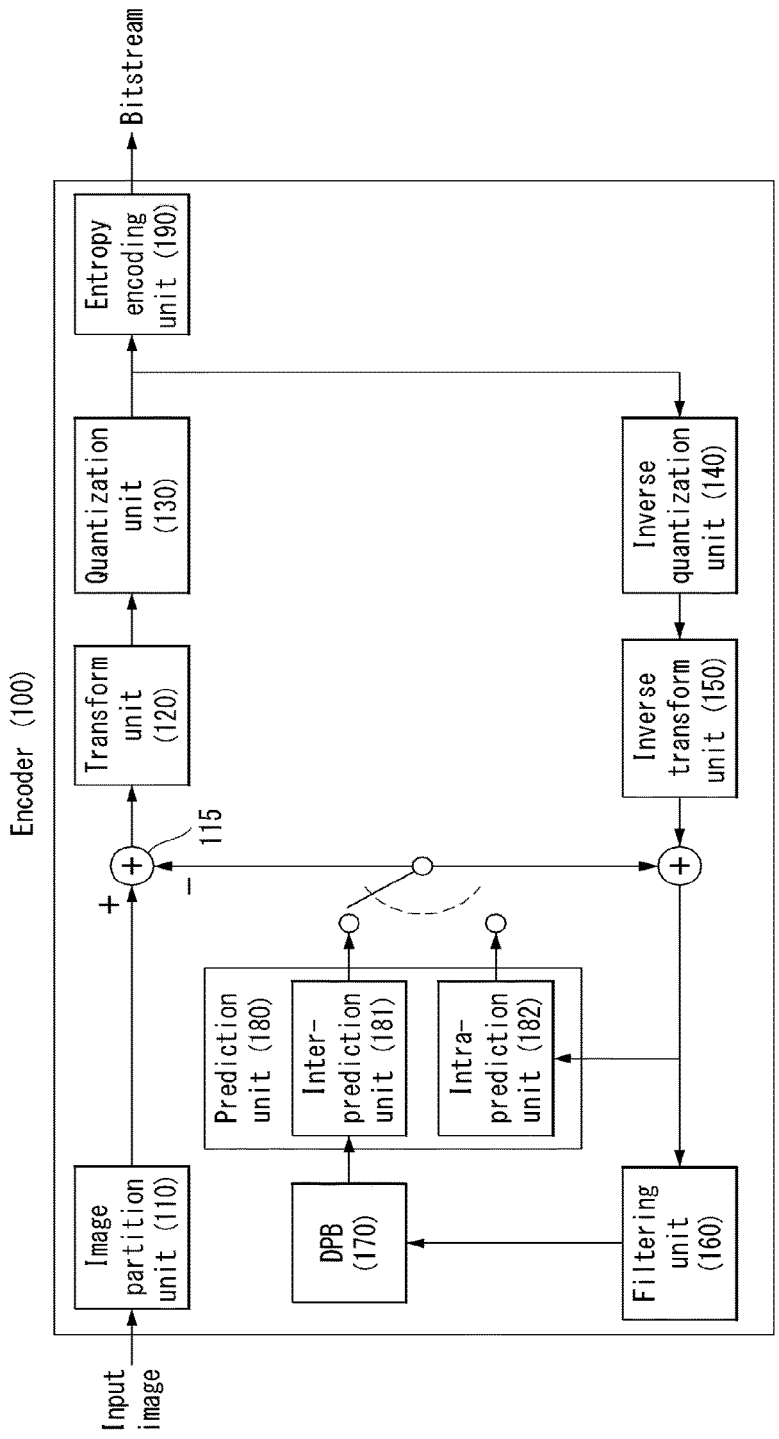
FIG. 1 is a block diagram of an encoder encoding a still image or a video signal according to an embodiment to which the present invention is applied.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art In some cases, in order to prevent the technical concept of the present invention from being unclear, structures or devices which are publicly known may be omitted, or may be depicted as a block diagram centering on the core functions of the structures or the devices Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out Specific terminologies used in the description below may be provided to help the understanding of the present invention. And, the specific terminology may be modified into other forms within the scope of the technical concept of the present invention. For example, a signal, data, a sample, a picture, a frame, a block, etc may be properly replaced and interpreted in each coding process.

Hereinafter, in the present disclosure, 'block' or 'unit' refers to a unit on which a process of encoding/decoding such as prediction, transform, and/or quantization is performed, and may be configured as a multi-dimensional array of a sample (or picture element or pixel).

'Block' or 'unit' may refer to a multi-dimensional array of samples regarding a luma component or a multi-dimensional array of samples regarding a chroma component. Also, both the multi-dimensional array regarding the luma component and the multi-dimensional array regarding the chroma component may be generally called 'block' or 'unit'.

For example, 'block' or 'unit' may be interpreted as having a meaning including all of a coding block (CB) which refers to an array of samples to be encoded/decoded, a coding tree block (CTB) including a plurality of coding blocks, a prediction block (PB) (or a prediction unit (PU)) which refers to an array of samples to which the same prediction is applied, and a transform block (TB) (or a transform unit (TU)) which refer to an array of samples to which the same transform is applied.

Also, in this disclosure, unless otherwise mentioned, 'block' or 'unit' may be interpreted to have a meaning including a syntax structure used in the process of encoding/decoding an array of samples regarding a luma component and/or chroma component. Here, the syntax structure refers to zero or more of syntax elements present within a bit stream in a specific order, and the syntax element refers to an element of data expressed within a bit stream.

For example, 'block' or 'unit' may be interpreted as having a meaning including all of a coding unit (CU) including a coding block (CB) and a syntax structure used for encoding the corresponding coding block, a coding tree unit (CTU) including a plurality of coding units, a prediction unit (PU) including a prediction block (PB) and a syntax structure used for predicting the corresponding prediction block (PB), a transform unit (TU) including a transform block (TB) and a syntax structure used for transforming the corresponding transform block (TB).

Also, in this disclosure, 'block' or 'unit' is not limited to an array of square or rectangular samples (or picture elements or pixels) and may refer to an array of samples (or picture elements or pixels) having a polygonal shape with three or more vertices. In this case, 'block' or 'unit' may be called a polygon block or polygon unit.

FIG. 1 is a block diagram of an encoder encoding a still image or video according to an embodiment to which the present invention is applied.

Referring to FIG. 1, an encoder 100 may include a picture partitioning unit 110, a subtract unit 115, a transform unit 120, a quantization unit 130, a dequantization unit 140, an inverse transform unit 150, a filtering unit 160, a decoded picture buffer (DPB) 170, a prediction unit 180 and an entropy encoding unit 190. And the prediction unit 180 may include an inter-prediction unit 181 and an intra-prediction unit 182.

The image segmentation unit 110 may segment an input video signal (or picture or frame) input to the encoder 100 into one or more blocks.

The subtract unit 115 may subtract a predicted signal (or predicted block) output from the prediction unit 180 (i.e., the inter-prediction unit 181 or the intra-prediction unit 182), from the input video signal to generate a residual signal (or a residual block). The generated residual signal (or residual block) is transmitted to the transform unit 120.

The transform unit 120 applies a transform method (e.g., discrete cosine transform (DCT), discrete sine transform (DST), graph-based transform (GBT), Karhunen-Loeve transform (KLT), etc.) to generate a transform coefficient. Here, the transform unit 120 may perform transformation using a transform method determined according to a prediction mode applied to the residual block and a size of the residual block to generate transform coefficients.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequatization and inverse transformation to the quantized signal through the dequantization unit 140 and the inverse transform unit 150, the residual signal may be reconstructed. By adding the reconstructed residual signal to the prediction signal that is outputted from the inter-prediction unit 181 or the intra-prediction unit 182, a reconstructed signal (or a reconstructed block) may be generated.

On the other hand, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved The decoded picture buffer 170 may store the filtered picture in order to use it as a reference picture in the inter-prediction unit 181

The inter-prediction unit 181 performs a temporal prediction and/or a spatial prediction by referencing the reconstructed picture in order to remove a temporal redundancy and/or a spatial redundancy.

Here, since the reference picture used for performing a prediction is a transformed signal that goes through the quantization or the dequantization by a unit of block when being encoded/decoded previously, there may exist blocking artifact or ringing artifact Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels.

The intra-prediction unit 182 predicts a current block with reference to samples around a block to be currently encoded. The intra-prediction unit 182 may perform the following process to perform intra-prediction. First, the intra-prediction unit 182 may prepare a reference sample required for generating a predicted signal. Also, the intra-prediction unit 182 may generate a predicted signal (predicted block) using the prepared reference sample. Thereafter, a prediction mode is encoded. Here, the reference sample may be prepared through reference sample padding and/or reference sample filtering. Since the reference sample has undergone a prediction and reconstructing process, it may have a quantization error. Thus, in order to reduce such an error, a reference sample filtering process may be performed on each prediction mode used for intra-prediction.

The predicted signal (or predicted block) generated through the inter-prediction unit 181 or the intra-prediction unit 182 may be used to generate a reconstructed signal (or reconstructed block) or a residual signal (or residual block).

Figure 2:
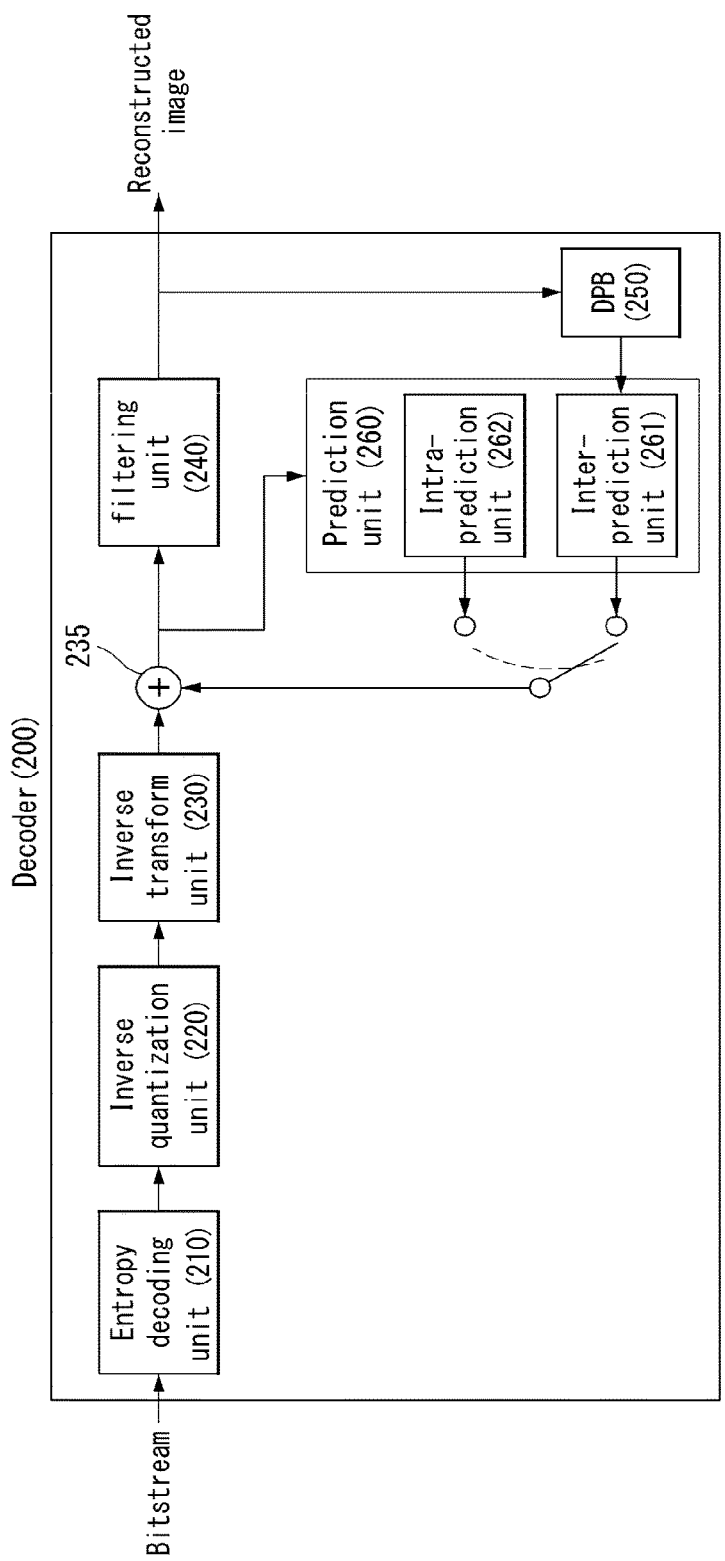
FIG. 2 is a block diagram of a decoder decoding a still image or a video signal according to an embodiment to which the present invention is applied.

FIG. 2 is a schematic block diagram of a decoder decoding a still image or a video signal according to an embodiment to which the present invention is applied.

Referring to FIG. 2, a decoder 200 may include an entropy decoding unit 210, a dequantization unit 220, an inverse transform unit 230, an add unit 235, a filtering unit 240, a decoded picture buffer (DPB) 250 and a prediction unit 260. And the prediction unit 260 may include an inter-prediction unit 261 and an intra-prediction unit 262

And, the reconstructed video signal outputted through the decoder 200 may be played through a play-back device The decoder 200 receives the signal (i.e., bit stream) outputted from the encoder 100 shown in FIG. 1, and the entropy decoding unit 210 performs an entropy decoding operation of the received signal The dequantization unit 220 acquires a transform coefficient from the entropy-decoded signal using quantization step size information.

The inverse-transform unit 230 inverse-transforms the transform coefficient by applying an inverse-transform technique to obtain a residual signal (or residual block).

The adder 235 adds the obtained residual signal (or residual block) to the predicted signal (or predicted block) output from the inter-prediction unit 261 or the intra-prediction unit 262 to generate a reconstructed signal (or reconstructed block).

The filtering unit 240 applies filtering to the reconstructed signal (or reconstructed block) and outputs the filtered signal to a reproducing device (or player) or transmits the same to the DPB 250. The filtered signal transmitted to the DPB 250 may be used as reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

Block Dividing Structure

Figure 3:
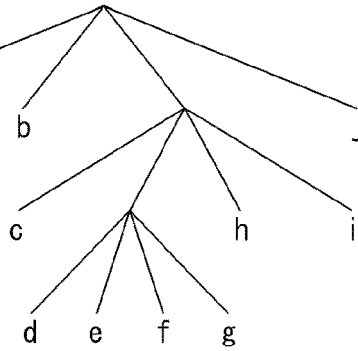
FIG. 3 is a view illustrating a structure of dividing a coding unit which may be applied to the present invention.
Figure 3:
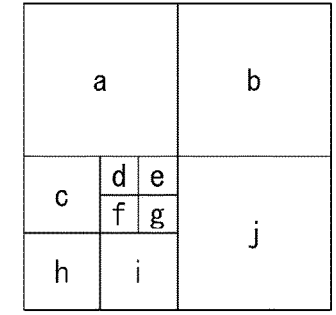

Generally, the block-based image compression method is used in the compression technique (e.g., HEVC) of a still image or a video. The block-based image compression method is a method of processing an image by partitioning it into a specific block unit, and may decrease the use of memory and the amount of operation FIG. 3 is a diagram for describing a partition structure of a coding unit that may be applied to the present invention An encoder partitions a single image (or picture) in a coding tree unit (CTU) of a rectangle shape, and encodes the CTU sequentially one by one according to a raster scan order In the HEVC, a size of CTU may be determined by one of 64×64, 32×32 and 16×16. The encoder may select and use the size of CTU according to the resolution of input image or the characteristics of input image. The CTU includes a coding tree block (CTB) for a luma component and the CTB for two chroma components that correspond to it.

One CTU may be partitioned into a quad tree structure. That is, one CTU may be partitioned into four units each having a square shape and having a half horizontal size and a half vertical size, generating coding units (CUs). Dividing the quad tree structure may be recursively performed. That is, a CU is hierarchically segmented to a quad tree structure from one CTU.

The CU means a basic unit of processing process of an input image, for example, the coding in which the intra/inter prediction is performed. The CU includes a coding block (CB) for a luma component and the CB for two chroma components that correspond to it. In the HEVC, a size of CU may be determined by one of 64×64, 32×32, 16×16 and 8×8.

Referring to FIG. 3, a root node of a quad tree relates to a CTU. The quad tree is partitioned until it reaches a leaf node, and the leaf node corresponds to a CU.

In detail, a CTU corresponds to a root node and has a smallest depth value (i.e., depth=0). The CTU may not be partitioned depending on characteristics of an input image, and in this case, the CTU corresponds to a CU.

The CTU may be partitioned into a quad tree form, and as a result, lower nodes having a depth of 1 (depth=1) are generated. A node (i.e., a leaf node) which is not partitioned any further from the lower node having a depth of 1 corresponds to a CU. For example, in FIG. 3(b), CU(a), CU(b), and CU(j) have been once partitioned from a CTU and have a depth of 1.

At least any one of the nodes having the depth of 1 may be partitioned into a quad tree form again, and as a result, lower nodes having a depth of 2 (i.e., depth=2) are generated. Also, a node (i.e., leaf node) which cannot be partitioned into any further from the lower node having a depth of 2 corresponds to a CU. For example, in FIG. 3(b), CU(c), CU(h), and CU(i) corresponding to nodes c, h, and i have been partitioned twice and have a depth of 2.

Also, at least any one of the nodes having the depth of 2 may be partitioned again into a quad tree form, and as a result, lower nodes having a depth of 3 (i.e., depth=3) are generated. Also, a node (i.e., leaf node) which cannot be divided any further from the lower node having the depth of 3 corresponds to a CU. For example, in FIG. 3(b), CU(d), CU(e), CU(f), and CU(g) corresponding to d, e, f, and g have been partitioned three times from the CTU and have a depth of 3.

In an encoder, the maximum size or the minimum size of a CU may be determined according to the characteristics of a video image (e.g., resolution) or by considering encoding rate. And, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). And, each partitioned CU may have the depth information. Since the depth information represents a partitioned count and/or degree of a CU, the depth information may include the information of a size of CU.

Since the LCU is partitioned in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a partition CU flag (split cu flag)) that represents whether the corresponding CU is partitioned may be forwarded to a decoder. This partition mode is included in all CUs except the SCU. For example, when the value of the flag that represents whether to partition is '1', the corresponding CU is further partitioned into four CUs, and when the value of the flag that represents whether to partition is '0', the corresponding CU is not partitioned any more, and the processing process for the corresponding CU may be performed.

As described above, the CU is a basic unit of the coding in which the intra-prediction or the inter-prediction is performed. The HEVC partitions the CU in a prediction unit (PU) for coding an input image more effectively.

The PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

The PU is not partitioned in the Quad-tree structure, but is partitioned once in a single CU in a predetermined shape. This will be described by reference to the drawing below.

Figure 4:
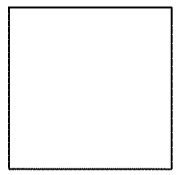
FIG. 4 is a view illustrating a prediction unit which may be applied to the present invention.
Figure 4:
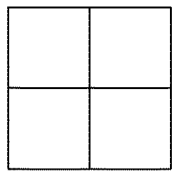
Figure 4:
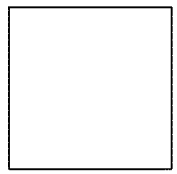
Figure 4:
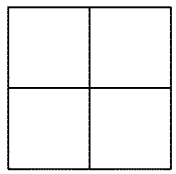
Figure 4:
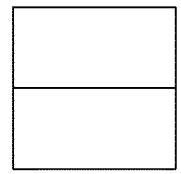
Figure 4:
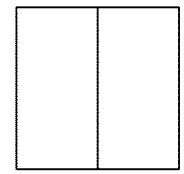
Figure 4:
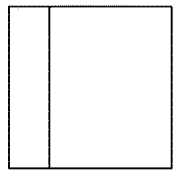
Figure 4:
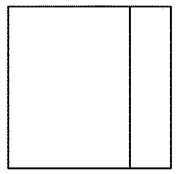
Figure 4:
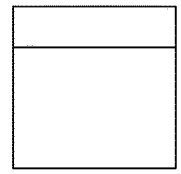
Figure 4:
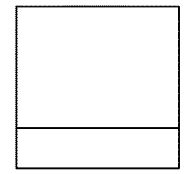

FIG. 4 is a diagram for describing a prediction unit that may be applied to the present invention.

A PU is differently partitioned depending on whether the intra-prediction mode is used or the inter-prediction mode is used as the coding mode of the CU to which the PU belongs.

FIG. 4(a) illustrates a PU of the case that the intra-prediction mode is used, and FIG. 4(b) illustrates a PU of the case that the inter-prediction mode is used.

Referring to FIG. 4(a), assuming the case that the size of a single CU is 2N×2N (N=4, 8, 16 and 32), a single CU may be partitioned into two types (i.e., 2N×2N or N×N).

Here, in the case that a single CU is partitioned into the PU of 2N×2N shape, it means that only one PU is existed in a single CU.

On the other hand, in the case that a single CU is partitioned into the PU of N×N shape, a single CU is partitioned into four PUs, and different prediction blocks are generated for each PU unit. However, such a PU partition may be performed only in the case that the size of CB for the luma component of CU is the minimum size (i.e., the case that a CU is an SCU).

Referring to FIG. 4(b), assuming the case that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×Nd.

Similar to the intra-prediction, the PU partition of N×N shape may be performed only in the case that the size of CB for the luma component of CU is the minimum size (i.e., the case that a CU is an SCU)

The inter-prediction supports the PU partition in the shape of 2N×N that is partitioned in a horizontal direction and in the shape of N×2N that is partitioned in a vertical direction In addition, the inter-prediction supports the PU partition in the shape of nL×2N, nR×2N, 2N×nU and 2N×nD, which is an asymmetric motion partition (AMP). Here, 'n' means ¼ value of 2N. However, the AMP may not be used in the case that the CU to which the PU is belonged is the CU of minimum size.

In order to encode the input image in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from the CU of 64×64 size to the CU of 8×8 size. The detailed process is as follows.

1) The optimal partition structure of PU and TU that generates the minimum rate distortion value is determined through performing the inter/intra-prediction, the transformation/quantization, the dequantization/inverse transformation and the entropy encoding for the CU of 64×64 size.

2) The optimal partition structure of PU and TU is determined to partition the 64×64 CU into four CUs of 32×32 size and to generate the minimum rate distortion value for each 32×32 CU.

3) The optimal partition structure of PU and TU is determined to further partition the 32×32 CU into four CUs of 16×16 size and to generate the minimum rate distortion value for each 16×16 CU.

4) The optimal partition structure of PU and TU is determined to further partition the 16×16 CU into four CUs of 8×8 size and to generate the minimum rate distortion value for each 8×8 CU.

5) The optimal partition structure of CU in the 16×16 block is determined by comparing the rate-distortion value of the 16×16 CU that is obtained in the process of 3) above with the addition of the rate-distortion value of the four 8×8 CUs that is obtained in the process of 4) above. This process is also performed for remaining three 16×16 CUs in the same manner.

6) The optimal partition structure of CU in the 32×32 block is determined by comparing the rate-distortion value of the 32×32 CU that is obtained in the process of 2) above with the addition of the rate-distortion value of the four 16×16 CUs that is obtained in the process of 5) above. This process is also performed for remaining three 32×32 CUs in the same manner.

7) Lastly, the optimal partition structure of CU in the 64×64 block is determined by comparing the rate-distortion value of the 64×64 CU that is obtained in the process of 1) above with the addition of the rate-distortion value of the four 32×32 CUs that is obtained in the process of 6) above.

In the intra-prediction mode, a prediction mode is selected in units of PU, and prediction and reconstruction are actually carried out on the selected prediction mode in units of TU.

The TU refers to a basic unit by which actual prediction and reconstruction are carried out. The TU includes a transform block (TB) regarding a luma component and a TB regarding two chroma components corresponding thereto.

In the foregoing example of FIG. 3, like one CTU is partitioned into a QT structure to generate CUs, a TU is hierarchically partitioned into a QT structure from one CU.

Since the TU is partitioned to a QT structure, the TU partitioned from a CU may be partitioned into smaller TUs again. In HEVC, a size of a TU may be determined to any one of 32×32, 16×16, 8×8, and 4×4.

Referring back to FIG. 3, it is assumed that a root node of a QT is related to a CU. A QT is partitioned until it reaches a leaf node, and the leaf node corresponds to a TU.

In detail, a CU corresponds to a root node and has a smallest depth (i.e., depth=0). The CU may not be partitioned according to characteristics of an input image, and in this case, the CU corresponds to a TU.

The CU may be partitioned to a QT form, and as a result, lower nodes having a depth of 1 (depth=1) are generated. Among the lower nodes having the depth of 1, a node which is not partitioned any further (i.e., a leaf node) corresponds to a TU. For example, in FIG. 3(b), TU(a), TU(b), and TU(j) respectively corresponding to a, b, and j have been once partitioned from a CU and have a depth of 1.

At least any one of nodes having the depth of 1 may also be partitioned to a QT form, and as a result, lower nodes having a depth of 2 (i.e., depth=2) are generated. Among the lower nodes having the depth of 2, a node which is not partitioned any further (i.e., a lead node) corresponds to a TU. For example, in FIG. 3(b), TU(c), TU(h), and TU(i) respectively corresponding to c, h, and I have been partitioned twice from a CU and have the depth of 2.

Also, at least one of nodes having the depth of 2 may be partitioned again to a QT form, and as a result, lower nodes having a depth of 3 (i.e., depth=3) are generated. Among the lower nodes having the depth of 3, a node which is not partitioned any further (i.e., a leaf node) corresponds to a CU. For example, in FIG. 3(b), TU(d), TU(e), TU(f), and TU(g) respectively corresponding to nodes d, e, f, and g have been partitioned three times and have the depth of 3.

The TU having a tree structure may be hierarchically partitioned with predetermined largest depth information (or largest level information). Also, each of the partitioned TUs may have depth information. Since depth information represents the number by which the TU has been partitioned and/or a degree to which the TU has been divided, the depth information may include information regarding a size of the TU.

Regarding one TU, information (e.g., a split TU flag (split_tranform_flag) representing whether the corresponding TU is partitioned may be delivered to the decoder. The split information is included in every TU except for a TU having a smallest size. For example, if the value of the flag representing partition is '1', the corresponding TU is partitioned again into four TUs, while if the flag representing partition is '0', the corresponding CU is not partitioned any further.

Encoding/Decoding Method Using Weighting Parameter-Based Loop Filtering

Figure 5:
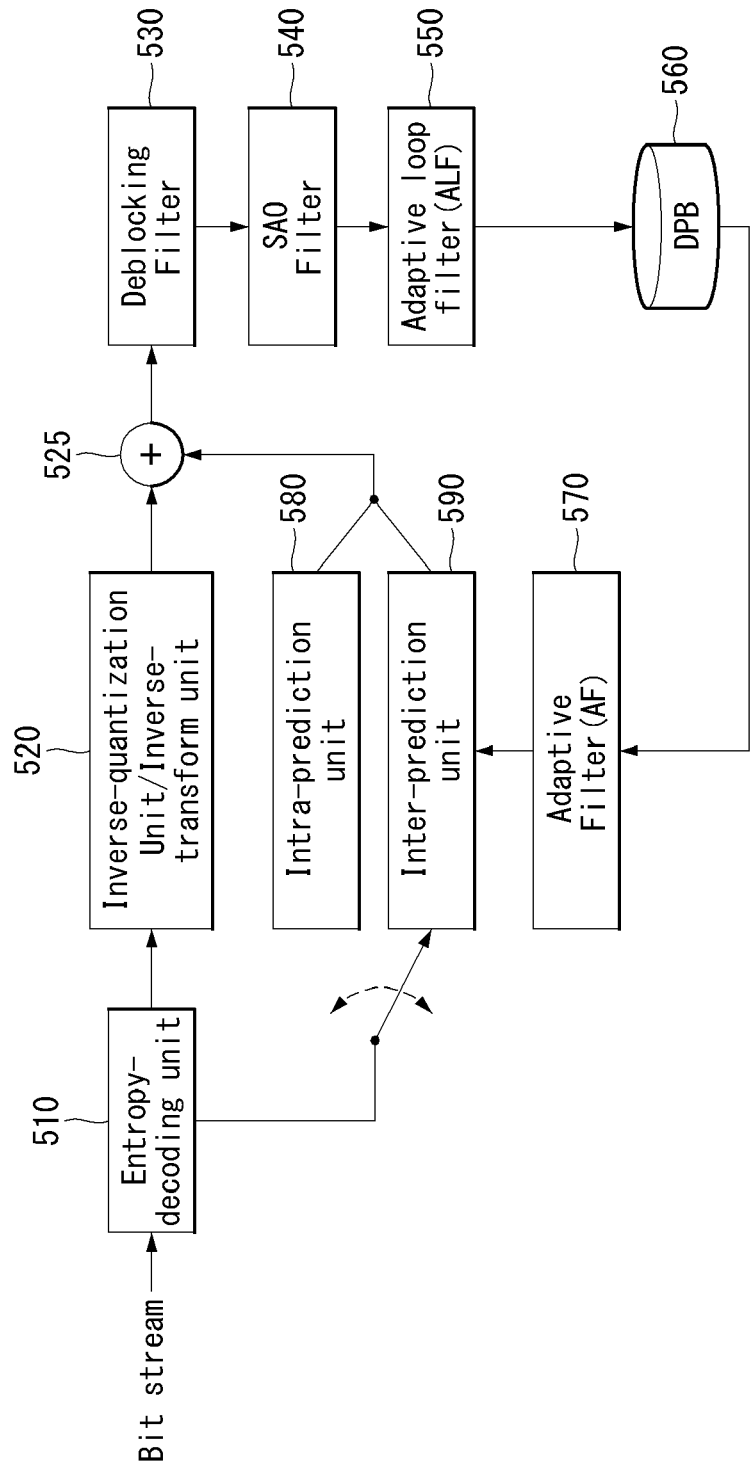
FIG. 5 illustrates a decoder including both an adaptive loop filter and an adaptive filter according to an embodiment of the present invention.

FIG. 5 illustrates a decoder including both an adaptive loop filter and an adaptive filter according to an embodiment of the present invention.

Referring to FIG. 5, the decoder may include an entropy-decoding unit 510, an inverse-quantization unit/inverse-transform unit 520, an adder 525, a deblocking filter 530, a sample adaptive offset (SAO) filter 540, an adaptive loop filter (ALF) 550, a decoding picture buffer 560, an adaptive filter (AF) 570, an intra-prediction unit 580, and an inter-prediction unit 590.

The entropy-decoding unit 510 entropy-decodes a signal (i.e., bit stream) output from an encoder.

The inverse-quantization unit/inverse-transform unit 520 obtains a transform coefficient from the entropy-decoded signal using quantization step size information and inverse-transforms the transform coefficient by applying an inverse-transform technique to obtain a residual signal (or a residual block).

In FIG. 5, a case in which an inverse-quantization unit and an inverse-transform unit are integrated is illustrated, but the inverse-quantization unit and the inverse-transform unit may be configured as separate components as illustrated in FIG. 2.

The adder 525 adds the obtained residual signal (or residual block) to a predicted signal (or predicted block) output from the prediction unit (i.e., the inter-prediction unit 590 or the intra-prediction unit 580) to generate a reconstructed signal (or a reconstructed block).

The embodiments described above in the inter-prediction unit 151 and the intra-prediction unit 182 of the encoder 100 of FIG. 1 may also be applied to the inter-prediction unit 590 and the intra-prediction unit 580 of the decoder in the same manner.

The deblocking filter 530 applies deblocking filtering to the reconstructed signal (or reconstructed image).

The SAO filter 540 applies SAO filtering by adding SAO to the deblocking filtering-applied reconstructed signal (or reconstructed image) by pixels.

The ALF 550 is a filter applied to the image to which the SAO filter has been applied, which is used to minimize an error with an original image.

In FIG. 5, a case in which the deblocking filter 530, the SAO filter 540, and the ALF 550 are separately configured is illustrated, but the deblocking filter 530, the SAO filter 540, and the ALF 550 may be implemented as a single filtering unit as illustrated in FIG. 2.

The DPB 560 may store filtered picture such that the filter picture may be used as reference picture in the inter-prediction unit 181.

The AF 570 is a filter applied to the image stored in the DPB 560, and may increase prediction performance when the image is used as a reference picture of a next frame (or picture). Here, the next frame (or picture) refers to a frame (or picture) as a decoding target in a next turn of a current frame (or picture) in a decoding order. Here, the decoding order may refer to an order of a syntax element processed according to a decoding process.

The ALF 550 and the AF 570 are filters for minimizing an error between two input images and have similar characteristics.

The ALF 550 minimizes an error between the original image (O_t) as a current (t time point) decoding target and the reconstructed image (R_t) (e.g., an image generated by adding a predicted signal and a residual signal) as expressed by Equation 1 below. Here, the reconstructed image (R_t) is a reconstructed image regarding the original image (O_t) as a current decoding target.

Thus, the encoder obtains a filter (or filter factor) f minimizing an error function E in Equation 1 below and transmits the obtained filter (or filter factor) f to the decoder.

$$E = \sum_{x,y} \left( O_t(x, y) - \sum_{i,j=-M/2-1}^{M/2} (f(i, j) \times R_t(x+i, y+j)) \right)^2 \quad \text{[Equation 1]}$$

In Equation 1 (x, y) indicates a horizontal coordinate and a vertical coordinate of a pixel, and M indicates a size of the filter.

The AF 570 minimizes an error between the original image (O_t+1) as a decoding target and the reconstructed image (R_t) (e.g., image generated by adding a predicted signal and a residual signal) at a next time (t+1 time point) as expressed by Equation 2 below. Here, the reconstructed image (R_t) indicates a reconstructed image regarding the original image (O_t) as a current (t time point) decoding target.

Thus, the encoder obtains a filter (or a filter factor) minimizing an error function E and transmits the same to the decoder.

$$E = \sum_{x,y} \left( O_{t+1}(x, y) - \sum_{i,j=-M/2-1}^{M/2} (f(i, j) \times R_t(x+i, y+j)) \right)^2 \quad \text{[Equation 2]}$$

In Equation 2, (x, y) indicates a horizontal coordinate and a vertical coordinate of a pixel to which the AF is applied, and M indicates a size of a filter.

In order to solve a problem in which filter application for increasing image quality of the reconstructed image and filter application for increasing image quality of the reference image are repeatedly used, the present invention proposes a method for applying a weighting parameter-based loop filter. Through single loop filtering, both an enhanced reconstructed image and a reference image may be obtained.

According to the present invention, by inducing the reconstructed image and the reference image to the weighting sum of the image before the loop filter is applied thereto and the image to which the loop filter is applied based on the weighting parameter, image quality of the reference image for the original image as a next decoding target, while increasing image quality of the reconstructed image, may be enhanced.

Hereinafter, in the description of the present invention, a loop filter may be designated as an in-loop filter and refer to a filter applied within the encoding/decoding process.

Also, for the purposes of description, picture, frame, and the like will generally be designated as an image.

Figure 6:
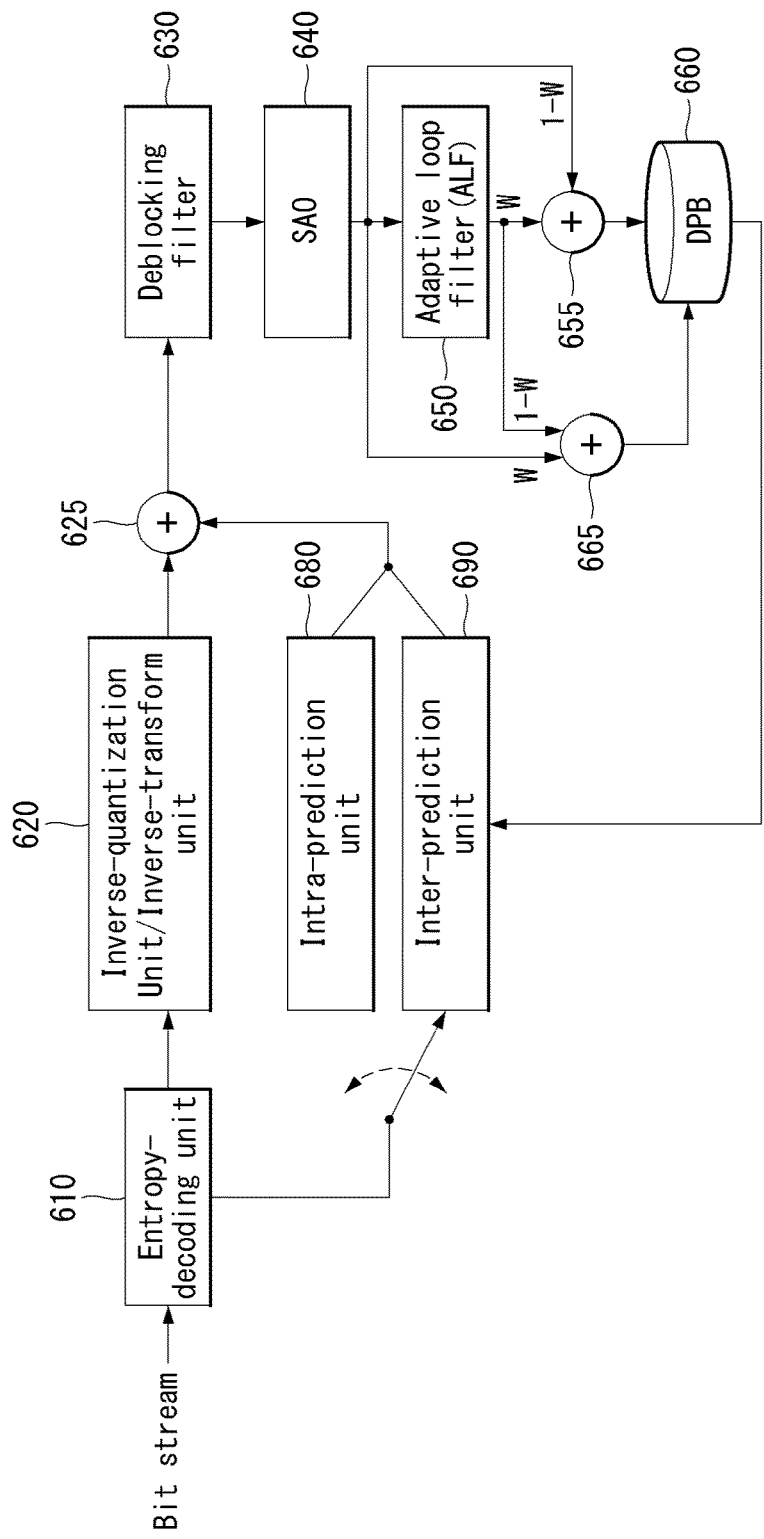
FIG. 6 illustrates a decoder including a weighting parameter-based loop filter according to an embodiment of the present invention.

FIG. 6 illustrates a decoder including a weighting parameter-based loop filter according to an embodiment of the present invention.

Referring to FIG. 6, the decoder may include an entropy-decoding unit 610, an inverse-quantization unit/inverse-transform unit 620, a first adder 625, a deblocking filter 630, a sample adaptive offset (SAO) filter 640, an ALF 650, a second adder 655, a DPB 660, a third adder 665, an infra-prediction unit 580, and an inter-prediction unit 690.

The entropy-decoding unit 610 entropy-decodes a signal (i.e., bit stream) output from the encoder.

The inverse-quantization unit/inverse-transform unit 620 obtains a transform coefficient from the entropy-decoded signal using quantization step size information, and inverse-transforms a transform coefficient by applying an inverse-transform technique to obtain a residual signal (or residual block).

In FIG. 6, it is illustrated that the inverse-quantization unit and an inverse-transform unit are configured together, but the inverse-quantization unit and an inverse-transform unit may be separately configured as illustrated in FIG. 2.

The first adder 625 adds an obtained residual signal (or residual block) to a predicted signal (or predicted block) output from the prediction unit (i.e., the inter-prediction unit 690 or the intra-prediction unit 680) to generate a reconstructed signal (or reconstructed block).

The embodiments described in the inter-prediction unit 181 and the intra-prediction unit 182 of the encoder 100 may be applied to the inter-prediction unit 690 and the intra-prediction unit 680 of the decoder in the same manner.

The deblocking filter 630 applies deblocking filtering to the reconstructed signal (or reconstructed image).

The SAO filter 640 applies SAO filtering by adding SAO to the deblocking filtering-applied reconstructed signal (or reconstructed image) by pixels.

The ALF 650 is a loop filter applied to the image to which the SAO filter has been applied, which is used to minimize an error with the original image.

In FIG. 6, the ALF is illustrated as a loop filter, but the present invention is not limited thereto and the present invention may be applied in the same manner using any other available loop filter than the ALF.

Also, in FIG. 6, it is illustrated that the deblocking filter 630, the SAO filter 640, and the ALF 650 are separately configured, but the deblocking filter 630, the SAO filter 640, and the ALF 650 may be implemented as a single filtering unit as illustrated in FIG. 2 above.

The decoding device according to the present invention may find the weighted sum of an image before the loop filter is applied and the image after the loop filter is applied on the basis of a weighting parameter value parsed from a bit stream output from the encoder to generate one or more of the reconstructed image and the reference image. This will be described in detail hereinafter.

The second adder 655 adds the image to which a weighting parameter w-applied ALF is applied and the image before a weighting parameter (1-w)-applied ALF is applied, to generate a final reconstructed image.

The third adder 665 adds the image to which a weighting parameter w-applied ALF is applied and the image before a weighting parameter (1-w)-applied ALF is applied, to generate a final reference image.

The DPB 660 may store the reconstructed image signal in order to reproduce the reconstructed image signal through a reproducing device, and/or store the reference image generated by the third adder 665 in order to use it as a reference image in the inter-prediction unit 181.

As illustrated in FIG. 6, the decoder may induce the reconstructed image and/or the reference image using the weighting parameter w transmitted from the encoder. This will be described in detail as follows.

The reconstructed image (A) as expressed by Equation 3 below may be generated.

Hereinafter, in order to distinguish the reconstructed image generated by applying the weighting parameter-based loop filter from the reconstructed image generated by the first adder 625, the image generated by the first adder 625 (i.e., the reconstructed image generated by adding the predicted signal and the residual signal) will be referred to as an 'image obtained using the predicted signal and the residual signal'.

$$\hat{R}_t = (1-w) \times R_t + w \times R'_t$$ [Equation 3]

In Equation 3, $R\_t$ indicates an image before the loop filter is applied, and $R'\_t$ indicates an image after the loop filter is applied.

Here, the image before the loop filter is applied may refer to an image obtained using the predicted signal and the residual signal or may refer to an image to which one or more of the deblocking filter and the SAO filter are applied.

Referring to Equation 3, the weighting parameter w is applied to the image (R'_t) after the loop filter is applied and the weighting parameter (1-w) is applied to the image (R_t) before the loop filter is applied, and thereafter, the both images may be added to obtain the reconstructed image ($\hat{R}_t$). That is, the reconstructed image may be generated by adding the image before the 1-w-applied loop filter is applied and the image after the w-applied loop filter is applied.

Also, the reference image (P_t+1) may be generated as expressed by Equation 4 below.

$$P_{t+1} = w \times R_t + (1-w) \times R$$ [Equation 4]

In equation 4, R_t refers to an image before the loop filter is applied, and R'_t refers to an image after the loop filter is applied.

Referring to FIG. 4, the weighting parameter (1-w) is applied to the image (R' t) after the loop filter is applied and the weighting parameter w is applied to the image (R_t) before the loop filter is applied, and thereafter, the both images may be added to obtain the reference image (P_t+1). That is, the reconstructed image may be generated by adding the image before the w-applied loop filter is applied and the image after the 1-w-applied loop filter is applied.

By generating the reconstructed image and/or the reference image, the case in which the weighting parameter w is 1 may obtain the same result as that of the case in which the ALF is applied for the reconstructed image in FIG. 5, and the case in which w is 0 may obtain the same result as that of the case in which the AF is applied for the reference image in FIG. 5.

Figure 7:
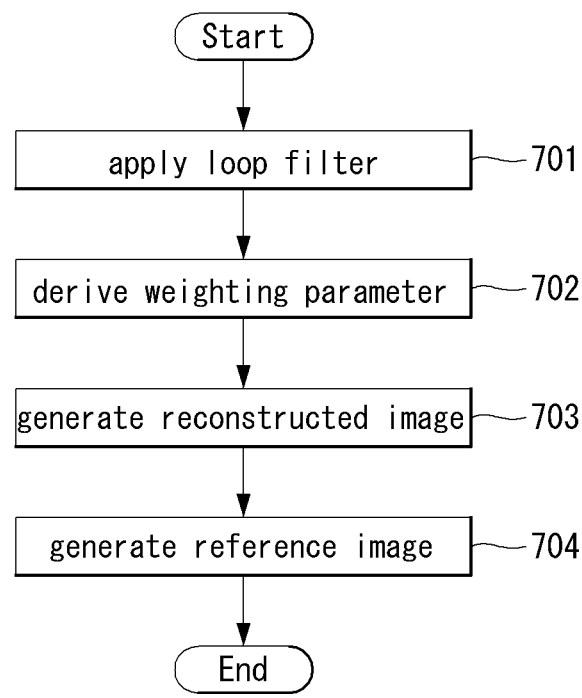
FIG. 7 is a view illustrating an image decoding method according to an embodiment of the present invention.

FIG. 7 is a view illustrating an image decoding method according to an embodiment of the present invention.

Referring to FIG. 7, the decoder applies a loop filter to an image obtained using the predicted signal and the residual signal (S701).

That is, the decoder may apply the loop filter using a loop filter factor received from the encoder. In this case, although not shown in FIG. 7, an operation of parsing (or deriving) the loop filter factor may be performed before step S701.

Also, the decoder may apply the loop filter to an image to which one or more of the deblocking filter and SAO has been applied.

Here, as an example of the loop filter, the ALF illustrated in FIG. 6 may be applied, and in addition, a loop filter widely known in an existing video codec may also be used.

The decoder derives (or parses) a weighting parameter (S702)>

That is, the decoder may decode (or derive or parse) a weighting value required for generating a reconstructed image and/or a reference image from a bit stream output from the encoder using the images before/after the loop filter is applied.

Meanwhile, in FIG. 7, the procedure in which step S702 is performed after step S701 for the purposes of description, but the present invention is not limited thereto and step S702 may be performed before step S701.

Hereinafter, step S702 will be described in detail.

Table 1 illustrates a slice (segment) header syntax according to an embodiment of the present invention.

Here, a slice header refers to a slice segment header of an independent slice segment, and the independent slice segment may refer to a current slice segment or the latest independent slice segment ahead of a currently dependent slice segment according to a decoding order.

TABLE 1

| | Descriptor |
|---|---|
| slice_segment_header() { | |
| ... | |
| weight_lf_enable_flag | ue(v) |
| if (weight_lf_enable_flag) | |
| weight_lf_idx | ue(v) |
| ... | |

Referring to Table 1, an LF weight enable flag ('weight_lf_enable_flag') syntax element is a flag indicating whether to use a weighting parameter according to the present invention. That is, the decoder may parse the flag (e.g., weight_lf_enable_flag) indicating whether to use a weight value from a bit stream output from the encoder.

For example, when the weight_lf_enable_flag value is 1 (that is, it is indicated by the flag that the weighting parameter is used), a reconstructed image and/or a reference image may be generated on the basis of the weighting parameter according to the present invention (please refer to FIG. 6 above), and when the weight_lf_enable_flag value is 0 (that is, it is indicated by the flag that the weighting parameter is not used), filtering for each of the reconstructed image and the reference image may be performed respectively (please refer to FIG. 5 above).

The LF weight value index (weight_lf_idx) syntax element indicates a weighting parameter according to the present invention.

For example, referring to the weighting parameter value according to the present invention, a certain real number value between 0 and 1 may be used as a weight value. Here, the encoder may transmit a value obtained by integerizing a weighting parameter value having a certain number value between 0 and 1 to the decoder through weight_lf_idx.

Or, the weight_lf_idx syntax element may indicate a quantized index of the weighting parameter according to the present invention. Table 1 illustrates a case in which the weight_lf_idx syntax element is transmitted in a form of a quantized index.

For example, as the weighting parameter value according to the present invention, a real number value between 0 and 1 may be quantized to a specific N number of values and transmitted in the form of an index. For example, in case where a quantization rate is 0.2, the encoder may quantize a real number value between 0 and 1 to five quantization sections such as $0 \leq w \leq 0.2$ (representative value 0), $0.2 \leq w \leq 0.4$ (representative value 0.2), $0.4 \leq w \leq 0.6$ (representative value 0.4), $0.6 \leq w \leq 0.8$ (representative value 0.6), $0.8 \leq w \leq 1$ (representative value 0.8) and transmit the five representative values or indices respectively indicating the sections to the decoder through weight_lf_idx.

Also, a table regarding a weighting parameter known by both the encoder and the decoder may be predefined, and the encoder may select the weighting parameter within the table and subsequently transmit an index indicating the selected weighting parameter to the decoder through weight_lf_idx.

Also, in case where a predetermined image is referred to by M number of images, only M−1 number of weight values regarding M−1 number of images among the M number of images may be transmitted through a bit stream, and a weight value for an image to which a weight value was not transmitted, among the M number of images, may be determined on the basis of the M−1 number of weight values.

For example, in case where a current image is referred to by M number of I mages in the future (that is, in case where the current image is used as a reference image regarding the M number of images in the future), a maximum of (M−1) number of weighting parameters may be transmitted from the encoder to the decoder. Here, one non-transmitted weight value may be induced on the basis of a condition in which the sum of the entire weight values is 1.

In the decoding method according to the present invention, on the basis of the weighting parameter value parsed from the bit stream output from the encoder, the image before the loop filter is applied and the image after the loop filter is applied may be found to have the weighted sum to generate one or more of a reconstructed image and a reference image. This will be described in detail.

On the basis of the weighting parameter induced in step S702, the decoder applies the weight value 1−w to the image before the loop filter is applied and applies the weight value w to the image after the loop filter is applied, and adds the both images to generate a reconstructed image (S703).

That is, the decoder may generate the reconstructed image using Equation 3 above.

On the basis of the weighting parameter induced in step S702, the decoder applies the weight value w to the image before the loop filter is applied and applies the weight value 1−w to the image after the loop filter is applied, and adds the both images to generate a reference image (S704).

That is, the decoder may generate the reference image using Equation 4 above.

Figure 8:
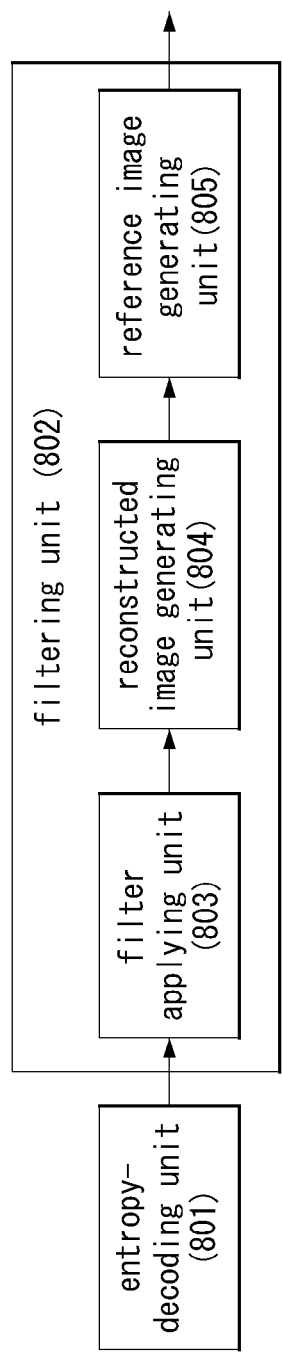
FIG. 8 is a block diagram of a decoding device according to an embodiment of the present invention.

FIG. 8 is a block diagram of a decoding device according to an embodiment of the present invention.

Referring to FIG. 8, the decoder implements the functions, processes, and/or methods proposed in FIGS. 5 to 7 above. In detail, the decoder may include an entropy-decoding unit 801 and a filtering unit 802, and the filtering unit 802 may include a filtering applying unit 803, a reconstructed image generating unit 804, and a reference image generating unit 805.

The components of the decoder illustrated in FIG. 8 are merely illustrative and some of the components of the decoder illustrated in FIG. 8 may be included in other components so as to be implemented together, any one component may be separate according to functions so as to be implemented, and any other component not illustrated in FIG. 8 may be added.

Meanwhile, in FIG. 8, a case in which the reconstructed image generating unit 804 and the reference image generating unit 805 are included in the filtering unit 802 is illustrated, but the reconstructed image generating unit 804 and the reference image generating unit 805 may be configured to be separated from the filtering unit 802 as illustrated in FIG. 6.

Also, the reconstructed image generating unit 804 and the reference image generating unit 805 may be configured as a single reconstructed image and reference image generating unit.

Also, the filtering unit 802 may further include the deblocking filter and the SAO filter as illustrated in FIGS. 5 and 6.

The entropy-decoding unit 801 derives (or parses) a weighting parameter.

That is, the entropy-decoding unit 801 may decode (or derive or parse) a weight value required for generating a reconstructed image and a reference image from a bit stream output from the encoder using the images before/after the loop filter is applied.

As illustrated in Table 1, the LF weighting index (weight_lf_idx) syntax element may be used to transmit the weighting parameter. Also, as described above, referring to the weighting parameter value, for example, a certain real number value between 0 and 1 may be used as a weight value, and a real number value between 0 and 1 may be quantized to a specific N number of values and transmitted in the form of an index.

Also, in case where a current image is referred to by M number of I mages in the future (that is, in case where the current image is used as a reference image regarding the M number of images in the future), a maximum of (M−1) number of weighting parameters may be transmitted from the encoder to the decoder.

Also, the entropy-decoding unit 801 may further derive (or parse) a flag (e.g., 'weight_lf_enable_flag') indicating whether to use the weighting parameter according to the present invention.

The filtering applying unit 803 applies a loop filter to an image obtained using a predicted signal and a residual signal.

That is, the filtering applying unit 803 may apply the loop filter using a loop filter factor received from the encoder. Here, the entropy-decoding unit 801 may parse (or derive) the loop filter factor.

Also, the filtering applying unit 803 may apply the loop filter to an image to which one or more of the deblocking filter and the SAO has been applied.

Here, as an example of the loop filter, the ALF illustrated in FIG. 6 may be used, and in addition to the ALF, a loop filter widely known in the existing video codec may also be used.

Here, as an example of the loop filter, the ALF illustrated in FIG. 6 may be used, and in addition to the ALF, a loop filter widely known in the existing video codec may also be used.

The reconstructed image generating unit 804 may apply the weight value 1−w to the image before the loop filter is applied and the weight value w to the image after the loop filter is applied on the basis of the weighting parameter derived from the entropy-decoding unit 801 and add them to generate a reconstructed image. That is, the reconstructed image generating unit 804 may generate the reconstructed image using Equation 3 above.

The reference image generating unit 805 may apply the weight value w to the image before the loop filter is applied and the weight value 1−w to the image after the loop filter is applied on the basis of the weighting parameter induced from the entropy-decoding unit 801 and add them to generate a reconstructed image. That is, the reference image generating unit 805 may generate the reference image using Equation 4 above.

Although not shown in FIG. 8, the reconstructed image generated by the reconstructed image generating unit 804 and the reference image generated by the reference image generating unit 805 may be stored in the DPB.

Hereinafter, a method for determining a weighting parameter in the encoder will be described.

Figure 9:
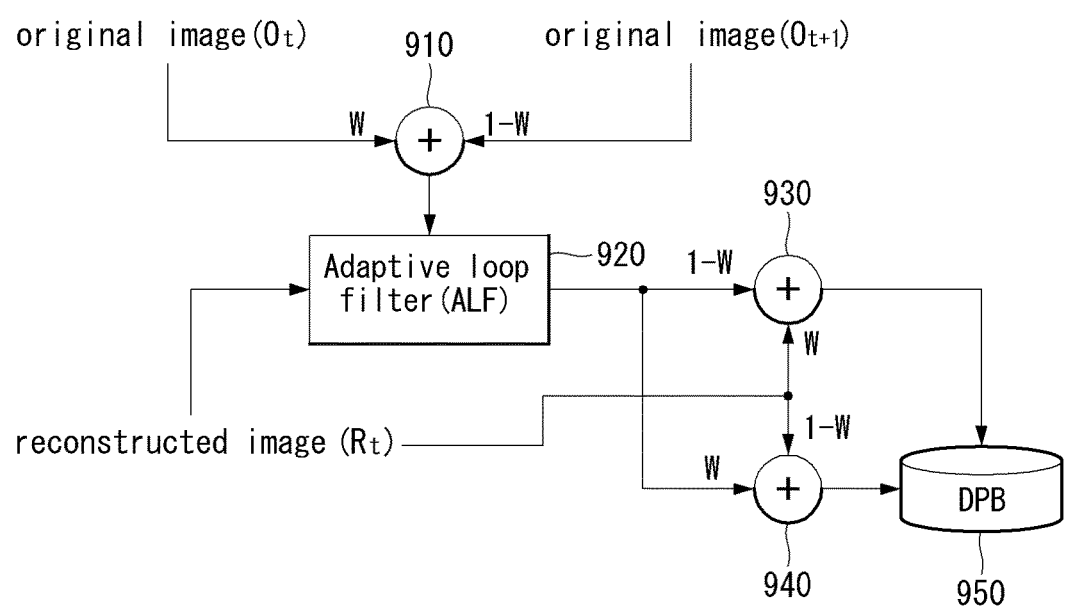
FIG. 9 illustrates an encoding device according to an embodiment of the present invention.

FIG. 9 illustrates an encoding device according to an embodiment of the present invention.

Referring to FIG. 9, the encoder may configured as a first adder 910, an ALF 920, a second adder 930, a third adder 940, and a DPB 950.

The components of the decoder illustrated in FIG. 9 are merely illustrative and some of the components of the decoder illustrated in FIG. 9 may be included in other components so as to be implemented together, any one component may be separate according to functions so as to be implemented, and any other component not illustrated in FIG. 9 may be added.

The first adder 910 adds the original image (O_t) of a current time to which the weight value w has been applied and the original image (O_t+1) of a next time to which the weight value 1−w has been applied, and transmits the same to the ALF 920.

Here, the original image (or frame) of the next time refers to an image (or frame) as an encoding target in a next turn of the current image (or frame) in an encoding order.

The ALF 920 may consider both the original image (O_t) as a current encoding target and the original image (O_t+1) to be encoded next time, and calculate a filter minimizing an error with the reconstructed image (R_t) and/or the weight value w. That is, the ALF 920 may determine a weight value minimizing an error between the image generated by performing the weighted sum of the original image as a current encoding target and the original image as a next encoding target on the basis of a certain weight value and the reconstructed image regarding the original image as the current encoding target.

In detail, as an input for calculating a filter (or a filter factor) in the ALF 920, the original image (O_t) of the current time, the original image (O_t+1) of the next time, and the reconstructed image (O_t+1) to which the deblocking filter/SAO have been applied are used.

An image calculated by the weight sum of the original image of the current time and the original image of the next time by the first adder 910 using the weighting parameter value w which may be transmitted to the decoder, may finally be used as an input of the ALF 920.

Also, the ALF 920 may calculate a filter minimizing an error between the image calculated as the weight sum of the original image of the current time and the original image of the next time and the reconstructed image (R_t), and determine w.

That is, the ALF 920 may calculate an error between the image calculated as the weight sum of the original image of the current time and the original image of the next time using every available w and the reconstructed image (R_t) and determine a filter and w minimizing the error.

This may be expressed by Equation 5 below.

$$E = \sum_{x,y} \left( (w \times O_t(x, y) + (1-w) \times O_{t+1}(x, y)) - \sum_{i,j=-M/2-1}^{M/2} (f(i, j) \times R_t(x+i, y+j)) \right)^2 \quad \text{[Equation 5]}$$

In Equation 5, O_t indicates the original image of the current time, O_t+1 indicates the original image of the next time, and R_t indicates the reconstructed image obtained using the predicted signal and the residual signal. Also, (x, y) indicates a horizontal coordinate and a vertical coordinate of a pixel, and M indicates a size of a filter.

The second adder 930 may generate a reference image by adding the image before the w-applied loop filter is applied and the image after the 1−w-applied loop filter is applied.

The third adder 940 may generate a reconstructed image by adding the image before the 1−w-applied loop filter is applied and the image after the w-applied loop filter is applied.

The DPB 950 may store the reference image generated by the second adder 930 and the reconstructed image generated by the third adder 940.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention

INDUSTRIAL AVAILABILITY

So far, the preferred embodiments of the present invention described above are disclosed as examples, and may be modified, changed, substituted or added by other various embodiments within the inventive concept and scope of the present invention described in the enclosed claims below by those skilled person in the art.

The invention claimed is:

1. A method for decoding an image, the method comprising:
    parsing a weight value (w) of a loop filter from a bit stream output from an encoder;
    applying the loop filter to an image obtained using a predicted signal and a residual signal; and
    generating one or more of a reconstructed image and a reference image by performing weighted sum of an image before the loop filter is applied and an image after the loop filter is applied, on the basis of the w,
    wherein the reconstructed image is generated by adding an image before 1-w-applied loop filter is applied and an image after w-applied loop filter is applied.

2. The method of claim 1, wherein the reference image is generated by adding an image before the w-applied loop filter is applied and an image after the 1-w-applied loop filter is applied.

3. The method of claim 1, further comprising:
    parsing a flag indicating whether the w is used from the bit stream,
    wherein when the flag indicates that w is used, one or more of the reconstructed image and the reference image are generated on the basis of the w.

4. The method of claim 3, wherein
    when the flag indicates by the flag that the w is not used, loop filtering is performed respectively to generate the reconstructed image and the reference image.

5. The method of claim 1, wherein
    when a predetermined image is referred to by M number of images, only M−1 number of weight values regarding M−1 number of images among the M number of images are transmitted through the bit stream, and
    a weight value regarding an image for which a weight was not transmitted, among the M number of images, is determined on the basis of the M−1 number of weight values.

6. The method of claim 1, wherein
    the loop filter is applied after one or more of a deblocking filter and a sample adaptive offset (SAO) are applied to an image obtained using the predicted signal and the residual signal.

7. The method of claim 1, wherein
    the w is determined as a weight value minimizing an error between an image generated by performing the weighted sum of an original image as a current encoding target and an original image as a next encoding target on the basis of a certain weight value and a reconstructed image regarding the original image as the current encoding target.

8. A device for decoding an image, the device comprising:
    an entropy-decoding unit parsing a weight value (w) of a loop filter from a bit stream output from an encoder;
    a filtering applying unit applying the loop filter to an image obtained using a predicted signal and a residual signal; and
    a reconstructed image and reference image generating unit generating one or more of a reconstructed image and a reference image by performing weighted sum of an image before the loop filter is applied and an image after the loop filter is applied, on the basis of the w,
    wherein the reconstructed image is generated by adding an image before 1-w-applied loop filter is applied and an image after w-applied loop filter is applied, and
    wherein the reference image is generated by adding an image before the w-applied loop filter is applied and an image after the 1-w-applied loop filter is applied.

* * * * *